(12) United States Patent
Heindl et al.

(10) Patent No.: US 12,399,486 B2
(45) Date of Patent: Aug. 26, 2025

(54) ENGINEERING SYSTEM AND METHOD OF ORCHESTRATING ENGINEERING SOFTWARE FOR A FACTORY AUTOMATION ENVIRONMENT

(71) Applicant: Siemens Aktiengesellschaft, Munich (DE)

(72) Inventors: Elisabeth Heindl, Cadolzburg (DE); Thomas Trenner, Fürth (DE)

(73) Assignee: Siemens Healthineers AG, Forchheim (DE)

( * ) Notice: Subject to any disclaimer, the term of this patent is extended or adjusted under 35 U.S.C. 154(b) by 351 days.

(21) Appl. No.: 18/017,827

(22) PCT Filed: Jul. 9, 2021

(86) PCT No.: PCT/EP2021/069095
§ 371 (c)(1),
(2) Date: Jan. 24, 2023

(87) PCT Pub. No.: WO2022/022984
PCT Pub. Date: Feb. 3, 2022

(65) Prior Publication Data
US 2023/0273601 A1    Aug. 31, 2023

(30) Foreign Application Priority Data
Jul. 29, 2020  (EP) ..................................... 20188371

(51) Int. Cl.
G05B 19/418      (2006.01)
(52) U.S. Cl.
CPC .................. *G05B 19/41835* (2013.01); *G05B 2219/31368* (2013.01)

(58) Field of Classification Search
CPC .... G05B 19/41835; G05B 2219/31368; G05B 19/18; H04L 2012/4026; H04L 12/40006; Y02P 90/02
(Continued)

(56) References Cited

U.S. PATENT DOCUMENTS 12,217,135 B1 *  2/2025  Kasturi ................. G06N 20/00
2017/0346768 A1   11/2017  Wise et al.
(Continued)

FOREIGN PATENT DOCUMENTS

CN       107438095 A    12/2017
CN       110462644 A    11/2019

OTHER PUBLICATIONS

PCT International Search Report and Written Opinion of International Searching Authority, mailed Nov. 11, 2021, corresponding to PCT International Application No. PCT/EP2021/069095.

*Primary Examiner* — Adil Ocak
(74) *Attorney, Agent, or Firm* — Lempia Summerfield Katz LLC (57) ABSTRACT

An engineering system and method of orchestrating engineering software for a factory automation environment are disclosed. The engineering system includes a message-broker configured to access and update a knowledge base based on operation of at least one of a plurality of engineering software. The plurality of engineering software is configured to generate and/or operate using engineering-data associated with at least one of design, commissioning, operation, and maintenance of the factory automation environment. The message-broker is configured to convert the engineering-data into messages recognizable by the plurality of engineering software and the knowledge base. At least one Graphical User Interface communicatively coupled to the message-broker is configured to enable access to the engineering-data via the message-broker, whereby at least (Continued)

one engineering software is configured to initiate actions in the factory automation environment based on the messages.

19 Claims, 3 Drawing Sheets

(58) Field of Classification Search
USPC .......................................................... 709/206
See application file for complete search history.

(56) References Cited

U.S. PATENT DOCUMENTS

| | | |
|---|---|---|
| 2018/0167476 A1 | 6/2018 | Hoffner et al. |
| 2019/0369984 A1 | 12/2019 | Malladi et al. |
| 2019/0370671 A1 | 12/2019 | Martinez et al. |
| 2020/0145494 A1 | 5/2020 | Buchstaller |
| 2023/0273601 A1 | 8/2023 | Heindl et al. |

* cited by examiner

FIG 2

ENGINEERING SYSTEM AND METHOD OF ORCHESTRATING ENGINEERING SOFTWARE FOR A FACTORY AUTOMATION ENVIRONMENT

The present patent document is a § 371 nationalization of PCT Application Serial No. PCT/EP2021/069095, filed Jul. 9, 2021, designating the United States, which is hereby incorporated by reference, and this patent document also claims the benefit of European Patent Application No. 20188371.7, filed Jul. 29, 2020.

TECHNICAL FIELD

The present disclosure relates to the engineering of industrial automation devices and systems in a factory automation environment and particularly to orchestrating engineering software used to engineer the devices and systems.

BACKGROUND

Engineering industrial/factory automation systems in a factory automation environment may be complex in view of the multiple software that may be used for their design, configuration, commissioning and in general for their engineering. Generally, the engineering software may be limited to certain domains or disciplines and may not provide all required information to an engineer.

Expert engineering systems used for multi-disciplinary/multi-domain data may require data from the multiple engineering software to be in a particular format. Therefore, such expert engineering systems may be inflexible and restricted to limited domains.

With the increase in the application of Artificial Intelligence (AI) in the factory automation environment. For example, in case of production automation, AI-based engineering of systems may need one or more AI techniques and workflows that interact with each. Further, AI-based engineering may also involve one or more type of databases that allow for making meaningful conclusions from correlations between engineering data from the automation environment and/or the engineering software. The multiple AI techniques and associated databases used for AI-based engineering may further complicate engineering automation devices and systems.

Therefore, such engineering systems and methods to enable seamless communication between engineering software may benefit from improvements.

SUMMARY AND DESCRIPTION

The object of the present disclosure is to enable flexible, scalable, and seamless engineering of automation devices & systems by linking/orchestrating the engineering software used for such engineering.

For example, the object is achieved by an engineering system for a factory automation environment. The system includes a message-broker configured to access and update a knowledge base based on operation of at least one of a plurality of engineering software, wherein the plurality of engineering software is configured to generate and/or operate using engineering-data associated with at least one of design, commissioning, operation and maintenance of the factory automation environment, wherein the message-broker is configured to convert the engineering-data into messages recognizable by the plurality of engineering software and the knowledge base; and at least one Graphical User Interface (GUI) communicatively coupled to the message-broker configured to enable access to the engineering-data via the message-broker, whereby at least one engineering software is configured to initiate actions in the factory automation environment based on the messages.

In another example, the object is achieved by the method of orchestrating a plurality of engineering software associated with a factory automation environment. The plurality of engineering software includes varied data structure and syntax. The method includes accessing a knowledge base for the factory automation environment based on operation of at least one of a plurality of engineering software, wherein the plurality of engineering software is configured to generate and/or operate using engineering-data associated with at least one of design, commissioning, operation, or maintenance of the factory automation environment; converting the engineering-data into messages recognizable by the plurality of engineering software and the knowledge base; enabling access to the engineering-data based on transmission and receipt of the messages; and enabling at least one engineering software to initiate actions in the factory automation environment based on the messages. For example, a user is enabled to initiate actions in the factory automation environment based on the messages.

Yet another example includes a computer program product, including computer readable code, that when executed on a processor, performs any one of the method acts of one or more of the methods disclosed herein.

The present disclosure may further include an AI-based engineering system configured to support engineering of the automation devices and systems based on changing needs of the engineer. The AI-based engineering system may include a knowledge database configured to store the engineering data generated from the engineering software in a distributed manner across multiple computing devices. The AI-based engineering system may further include AI approaches/AI modules configured to operate on the knowledge base. The AI modules may be individually configured to function differently from each other, thereby generating varied results. Accordingly, the varied results from the AI modules may be advantageously integrated and provided to the engineer.

The engineering system advantageously provides seamless linking of several AI modules/AI approaches in combination with a distributed knowledge base. The technical effect of such a linking/orchestration is that the engineer is able to harness the advantages of the individual AI modules in a flexible and scalable manner. The flexibility and scalability of the present disclosure enables easier integration of new engineering software/AI modules. For example, the engineer does not need to reconfigure the present system in case a new AI module is used for commissioning the automation devices in the factory automation environment.

Various definitions for certain words and phrases are provided throughout this disclosure, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. The features explained in the context of the suggested method may also be included within the suggested system by appropriately configuring and adapting the system and vice versa.

As used herein, "factory automation environment" refers to a facility for manufacture or production that may be semi-automated or completely automated. In addition to the facility, the factory automation environment includes engineering software to design and engineer the facility. Further, the factory automation environment may include automation engineers using the engineering software. The automation devices and system may be part of the factory automation environment. The factory automation environment may also be referred to as an industrial automation environment or laboratory automation environment.

As used herein, the term "engineering software" refers to software tools that allows engineers from multiple disciplines to work on common or connected engineering-data. The plurality of engineering software is associated with the factory automation environment. The plurality of engineering software is configured to generate and/or operate using engineering-data associated with at least one of design, commissioning, operation, and maintenance of the factory automation environment. For example, in a factory setting, a factory planner may work together with a mechanical engineer, an electrical engineer and an automation engineer to plan a new production line for a car door assembly. When an automation engineer introduces a new programmable logic controller (PLC) to a project, this information is stored as engineering-data in the knowledge base. The plurality of engineering software receives user inputs and actions Computer Aided Design software. The plurality of engineering software may include engineering software related to electrical, mechanical, process technology, software, and other subordinate elements from different engineering disciplines.

As used herein, "knowledge base" refers to one or more databases that are configured to store the engineering-data associated with the factory automation environment. For example, the knowledge base includes at least a graph-based database, an ontological database distributed within the factory automation environment and a cloud computing platform. The knowledge base may be updated using a data integration module. The message-broker may be communicatively coupled with the data integration module configured to integrate the engineering-data from the plurality of engineering software into the knowledge base. The engineering-data may be indexed in each of the databases or selectively indexed into a single database depending on the confidentiality of the engineering data and the location of the database. For example, the ontological database may be located with the factory automation environment on a private network associated with the factory automation environment. High frequency sensor data associated with a rotating system in the factory automation environment may be stored in the ontological database as compared to a knowledge graph database hosted on the cloud computing platform.

The present disclosure advantageously proposes an engineering system that is capable of providing access and updated engineering-data from the knowledge base. This is achieved using the message-broker that is configured to access and update the knowledge base then and operation in any one of the engineering software is performed. The message-broker is configured to generate messages that are transmitted between the engineering software, the knowledge base and the engineer via the GUI. The message-broker may be configured to generate the messages according to a message format interpretable by the plurality of engineering software, the knowledge base, and the GUI (collectively referred to as interacting systems). Further, the knowledge base, the GUI, the AI modules, and the plurality of engineering software are modifiably registered as subscribers and/or publishers to the message-broker. For example, the message-broker may be configured to operate as a message queue-based middleware used for exchange of the messages. Accordingly, the message-broker may function as a dedicated message bus that is communicatively coupled to the interacting systems. The engineering software the knowledge base and the GUI may act as multi-directional publisher and subscribers to the message-broker. Therefore, the message-broker may be configured to enable multi-directional transmission of the messages from the rule engines, the GUI, and the AI modules based on a unified message queue.

In an embodiment, the message-broker is configured to the engineering-data according as message content and message exchange parameters. The message exchange parameters include conditions at which the messages will be transmitted and received. A publisher (such as the engineering software) of the message may use a unique message identifier that may be used by the knowledge base and the GUI for reference. Accordingly, the message identifier provides the sequence and the togetherness of the messages are uniquely recognizable. Therefore, the notification displayed on the GUI is tied to the most relevant user interaction or operation.

In another embodiment, the interacting systems may not be subscribers to all the messages published by the message-broker. For example, the messages to the engineer may only need messages directed to the GUI. Further, the GUI may be configured to subscribe to messages including hints with respect to displaying the notification or associated engineering-data. Accordingly, the message-broker may be advantageously configured to enable customizable filters at points of message exchange or through additional points of message exchange. In an embodiment, the filters may be generated based on kind of participant such as the engineering software, the GUI, the data integrator module, and on the message format (e.g., question, answer, recommendation).

The access provided to the engineering-data via the message-broker enables the engineer to initiate actions in the factory automation environment. For example, a message from one of the engineering software may provide an updated configuration of an automation device such as a robot. The engineer may be notified with the new configuration via the GUI. The engineer may then update the configuration of the robot based on the notification.

In an embodiment, the message-broker is configured to receive the engineering-data from rule engines associated with the plurality of software. As used herein the rule engines are configurable based on industry standards and/or manufacturing requirements. In an embodiment, IEC 61499 standard may be used to configure the rule engines. IEC 61499 standard relates to distributed control and automation based on event triggers in an automation environment. In another embodiment, ISO standard 26262 for safety of driving systems on roads may be used to configure the rule engines. As indicated, the industry standards depend on the industry associated with the factory automation environment.

For example, the engine uses a configuration engineering software to configure an automation device to respond to multiple emergency stops. An emergency stop may be linked to input/output tags, program blocks, and user interface blocks. When a new emergency stop is added, input/output tags, program blocks, and user interface blocks may need to be generated. If the engineer inadvertently omits the generation of the user interface block, the rule engine associated with the engineering software recognizes the omission.

Further, the rule engine may be configured to send the engineering-data to the knowledge base as messages indicating the omission.

In an embodiment, the rule engine may further be configured to access the knowledge base by the message-broker. Considering the above example, the rule engine may be configured to determine correlations and dependencies between the new emergency stop and the associated tags and blocks. By determining the correlations and the dependencies, the rule engine identifies the user interface block committed by the engineer. The rule engine may also be configured to publish a message indicating a location in the GUI associated with the user interface block to notify the engineer to generate the same. In another embodiment, the rule engine may be configured to publish a message to the engineering software triggering automatic generation of the user interface block.

In an embodiment, the message-broker is communicatively coupled to AI modules configured to analyze operation of the plurality of engineering software, a user input from the GUI, or a combination thereof. The AI modules may include a neural network module, a reinforcement learning module, rule-based module, and the combination thereof. For example, the rule engine associated with the engineering software used for configuring emergency stops may be a rule-based module. The rule-based model may be configured to get active when an additional emergency stop is introduced for a particular automation device. Accordingly, the rule-based module may be configured based on rules generated from the industry standards. In another example, the rules may also be generated based on coding guidelines associated with the knowledge base.

The AI modules may be configured to map the operation of the plurality of engineering software, the user input, or the combination to the engineering-data in the knowledge base. The message-broker transmits the mapped engineering-data to the at least one engineering software to enable the at least one engineering software to initiate actions in the factory automation environment.

To effectively access the knowledge base, the AI modules or the rule engines may be configured to publish messages in classifiable message formats such as message formats classified as query format, response format, recommendation format and action format. In an embodiment, an operation of the engineer may trigger a message in the question format with associated engineering-data used to query the knowledge base. For example, the engineer does not generate a user interface block for an emergency stop. Similarly, the knowledge base, the GUI, and the plurality of engineering software are also configured to publish and/or receive messages in the above-mentioned message formats. Accordingly, in the engineering system disclosed herein, the messages are received and transmitted in one or more message formats classified as the query format, the response format, the recommendation format, and the action format.

The present disclosure advantageously proposes the method of orchestrating the plurality of engineering software associated with the factory automation environment. As used herein, "orchestration of the plurality of engineering software" refers to integration of the engineering-data generated through the operation of the engineering software. Further, orchestration of the engineering software integrates dependencies between the individual engineering software and the engineering-data. Furthermore, orchestration refers to an automated arrangement and coordination between the engineering software via the message-broker.

According to the method, the knowledge base is accessed based on operation of at least one of the plurality of engineering software. The operation performed in the at least one engineering software is mappable to the knowledge base. In an embodiment, the engineering data associated with the operation is updated in the knowledge base.

Therefore, the method captures actions operations and interactions between the engineer and the plurality of engineering software in tangible searchable form. To enable access and operation of the knowledge base, the engineering-data into messages recognizable by the plurality of engineering software and the knowledge base. The messages are transmitted and received between the plurality of engineering software and the knowledge base using the message-broker. By converting the engineering-data into messages, comprehensive engineering information across the plurality of engineering software is made available to the engineer. This enables the engineer to initiate actions in the factory automation environment. In an embodiment, the actions may automatically be initiated when the engineering software is triggered by one or more messages from other engineering software in the plurality of engineering software or from the knowledge base.

The method may include integrating the engineering-data from the plurality of engineering software into the knowledge base. Further, the method may also include analyzing operation of the plurality of engineering software, a user input from the GUI, or a combination thereof, through at least one of neural networks, reinforcement learning, and rule-based logic. By analyzing the operation, interaction of the engineer or an input provided by the engineer/user relevant engineering-data from the knowledge base may be accessed. Accordingly, the method may include mapping the operation of the plurality of engineering software, the user input, or the combination to the engineering-data in the knowledge base, wherein a message-broker transmits the mapped engineering-data to the at least one engineering software to enable the at least one engineering software to initiate actions in the factory automation environment.

In an embodiment, the operation, the user input, or combination thereof may be mapped to the engineering-data by determining dependencies between the engineering-data in the knowledge base and the operation, the user input, or the combination thereof. For example, pattern matching neural networks, reinforced learning, or pattern-based rules may be used to determine the dependencies.

The method may include displaying a notification on a GUI associated with the at least one engineering software indicating the actions to initiate in the factory automation environment, wherein the actions and the notification are transmitted as the messages recognizable by the GUI, the plurality of engineering software, and the knowledge base. For example, the actions may include configuring only configuring systems, sub-systems, or components of automation devices and systems within the factory automation environment. Accordingly, the method may include engineering the systems, the sub-systems, or the components based on the actions received as the messages by the GUI. The method may also include reconfiguring the systems, the sub-systems, or the components based on the actions received as the messages by the GUI.

An advantage of the present disclosure includes linking several AI approaches in the context of factory automation. The engineering system and method advantageously accommodates specific requirements of the AI approaches while being flexible.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

BRIEF DESCRIPTION OF THE DRAWINGS

Below, the disclosure is described using the embodiments illustrated in the figures.

DETAILED DESCRIPTION

Hereinafter, embodiments for carrying out the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1:
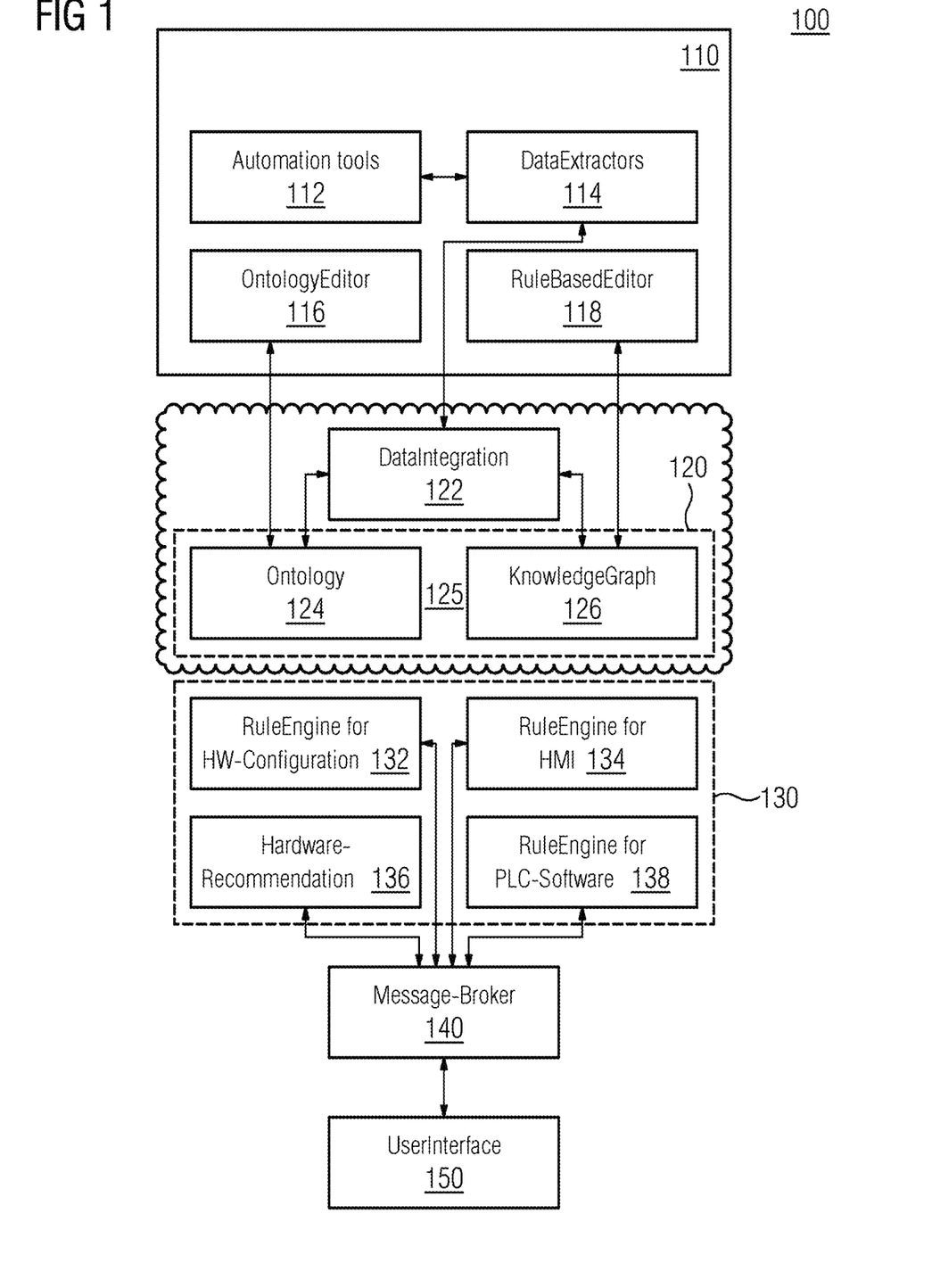
FIG. 1 illustrates an engineering system for a factory automation environment, according to an embodiment.

FIG. 1 illustrates an engineering system 100 for a factory automation environment, according to an embodiment of the present invention. The engineering system 100 includes an extraction sub-system 110, a data integration module 122, a knowledge base 125, a rule module 130, a message-broker 140, and a user interface 150.

The extraction sub-system 110 includes a plurality of software 112 and data extraction modules 114 associated with the engineering software 112. As indicated earlier, the engineering software 112 may be used for design, commissioning, operation, and maintenance of the factory automation environment. The engineering software include simulation software, Computer Aided Design software, Finite Element Analysis (FEA) software, Cause and effect mapping software, Piping and instrumentation diagrams (PI&Ds) software, and the like. Further, the data extraction modules 114 may include pattern-based module, machine learning module, reinforcement module, and similar such AI modules. The extraction sub-system 116 also includes an ontology editor module 116 and a graph editor module 118.

The data integration module 122 is communicatively coupled to the data extraction modules 114 and the knowledge base 125. The knowledge base 125 includes an ontology database 124 and a knowledge graph database 126. The ontology database 124 is communicatively coupled to the ontology editor module 116 and the knowledge graph database 126 is communicatively coupled to the graph editor module 118. In an embodiment, the data integration module 122 and the knowledge base 125 are implemented on a cloud computing platform 120.

The extraction sub-system 110, the data integration module 122, the knowledge base 125, and the user interface 150 are configured to communicate with each other using the message-broker 140. The message-broker 140 is communicatively coupled to the rule module 130 configured to define rules for communication between the automation engineering software 112, the data extraction modules 114, the user interface 150, and the message-broker 140. The rule module 130 includes a configuration rule engine 132 used to generate message rules for hardware configuration software, which is used to configure hardware in the factory automation environment. The rule module 130 further includes an interface rule engine 134 to generate message rules for the user interface 134. The rule module 130 additionally includes a recommendation rule engine 136 to generate message rules for a recommendation engineering software that recommends latest hardware and software versions for automation devices in the factory automation environment. The rule module 130 also includes a software rule engine 138 to configure controller software of controllers in the factory automation environment.

The user interface 150 may be used by the engineer engineering the factory automation environment to access the knowledge base 125. Further, the user interface 150 may be used by an administrator or any user that to customize the rule module 130, ontologies in the ontology database 114 via the ontology editor 116, and visualize the knowledge database 126.

During initialization, the data extraction modules 114 are configured to populate the knowledge graph database 126. For example, semantic information about the ontologies associated with the factory automation environment is used to populate the knowledge graph database 126. The ontologies provide definitions of concepts and relations between the engineering-data. The engineering ontology may be built based on existing ontological standards for a domain. For example, IEEE 1872-2015 Standard Ontologies for Robotics and Automation (IEEE-SA, 2015), which establishes a series of ontologies about the Robotics and Automation. In another example, Ontology for Industry 4.0 (O4I4) is dedicated to capture the Industry 4.0-specific domain concepts.

In operation, the data extraction modules 114 are configured to extract engineering-data relating to different disciplines from the plurality of engineering software 112. For example, the data extraction modules 114 including the AI modules is configured to analyze operation of the engineering software 112, a user input from the user interface 150, or a combination thereof. Based on the analysis, the data extraction modules 114 publishes the engineering-data as messages to the message-broker 140.

The data integration module 122 is configured to integrate the engineering-data extracted by the data extraction modules 114 into the ontology database 124 and the knowledge graph database 126. The integration operation may be performed by generating additional links in the knowledge graph database 126 to store the extracted engineering-data. The data integration module 122 may be configured to map the extracted engineering-data associated with the operation and/or the user input to the knowledge base 125. Based on the mapping, a notification may be generated as messages to the user interface 150.

The message-broker 140 is configured as a message queue-based middleware used for message exchange. The engineering-data extracted by the data extraction modules 114 is converted into messages and published to the message-broker 140. The messages may also include a message type or a message format such as Question, Answer, Recommendation, or Automatic Engineering Action. Based on the messages transmitted and received, at least one of engineering software 112 is configured to initiate actions in the factory automation environment based on the messages.

In operation, the data extraction modules 114, the data integration module 122, the knowledge base 125, or the user interface 150 may be registered as "consumers"/"subscriber" that for certain messages and "publisher" transmit for certain "channels and sub-channels". The channels and subchannels may include filters to enable the consumers to subscribe for specific messages (engineering-data) of interest.

For example, a message may include the following: publisher, associated engineering-data, subscriber, user input/operation performed in the engineering software 112, metadata associated with the user input/operation such as prior operation, current engineering software used, semantics of the user input, response from the knowledge base 125, or semantics of the response.

The message-broker 140 may further be used to configure the messages. For example, new message providers or newly registered publishers may communicate the structure of the message to the message-broker 140. In another example, the rule module 130 is configured to generate the message structure and publish the same to the providers and the subscribers. The message structure may be read by the subscribers registered to the message-broker 140. Additionally, the publishers and the subscribers may sign off certain channels of the message-broker 140. Further, the subscribers may receive text a standardized message that a channel is no longer served. Accordingly, the data extraction modules 114, the data integration module 122 the knowledge base 125 and the user interface 150 may be linked in a highly flexible manner.

Figure 2:
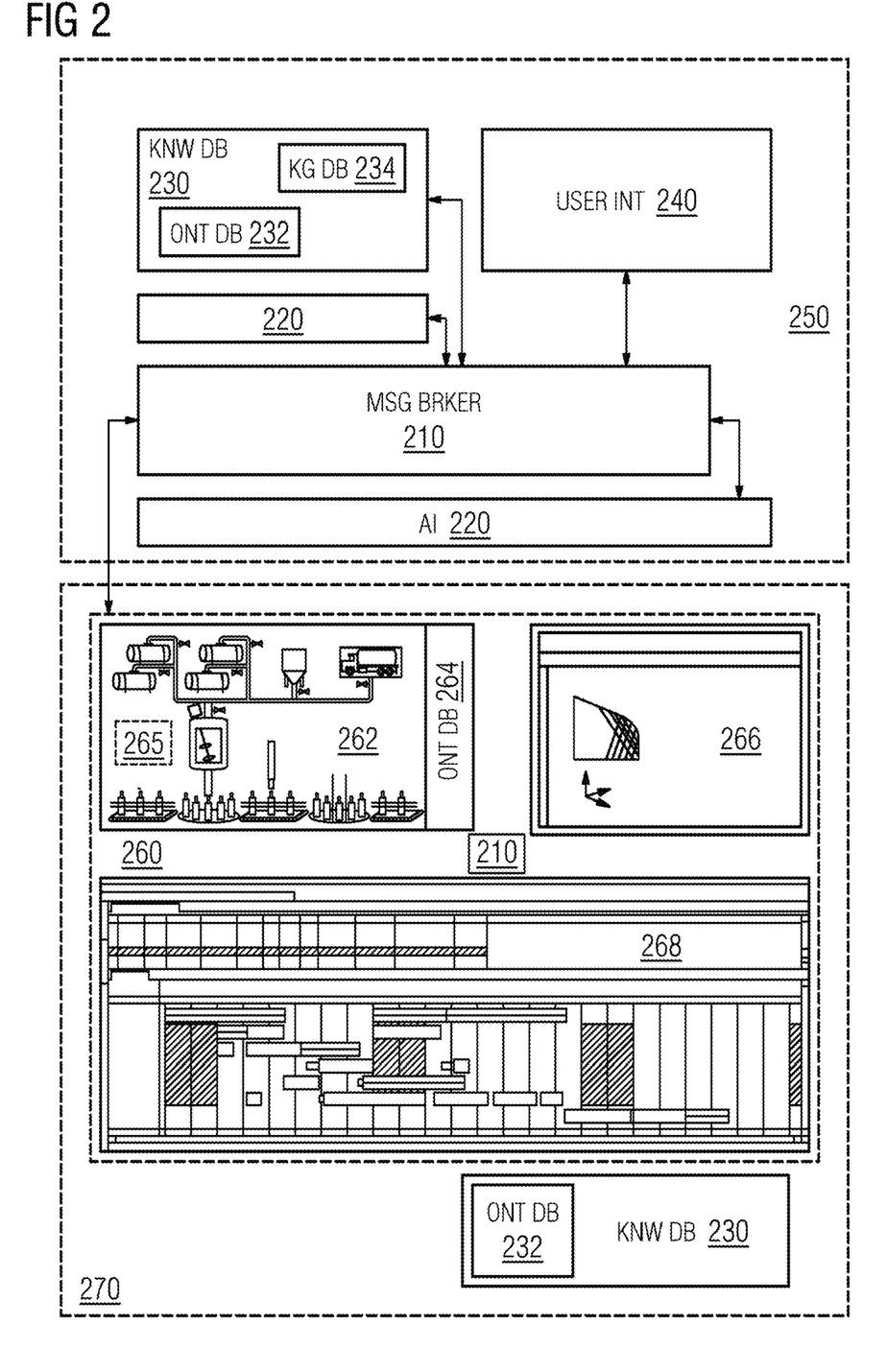
FIG. 2 illustrates an engineering system for a factory automation environment, according to an embodiment.

FIG. 2 illustrates an engineering system 260 for a factory automation environment 270, according to an embodiment of the present invention. The engineering system 260 is configured to execute one or more engineering software applications 262, 266, 268. For example, the engineering software applications are process engineering software 262 and associated process ontology editor 264, a simulation software 266, and a project scheduling software 268. A person skilled in the art would appreciate that ontology editors or knowledge graph editors may be plugged into the simulation software 266 and the project scheduling software 268. The ontology editors such as the process ontology editor 264 and the knowledge graph editors may be configured as data extraction modules 114.

The engineering system 260 may further include a message broker 210 configured to receive engineering data from the software applications 262, 266, and 268 via the ontology editors and the knowledge graph editors. For example, the engineer may add additional process element 265 using the process engineering software 262. The process ontology editor 264 is configured to map the operation of the engineer to the engineering-data associated with the process element 265. The process ontology editor 264 publishes a message to the message broker 210 with the engineering-data associated with the process element 265, metadata associated with the operation of adding the process element 265, input/output tags of the process element 265, et cetera.

In an embodiment, the factory automation environment 270 may include a knowledge base 230 including an ontology database 232. The knowledge base 230 is configured to store engineering data and ontology rules associated with the factory automation environment 270. The knowledge base 230 may be distributed across multiple devices within the factory automation environment 270.

The engineering system 260 is configured to communicate with a cloud computing platform 250. The cloud computing platform 250 includes multiple modules 210, 220 and database 230 hosted and deployed in a distributed computing environment. For example, the cloud computing platform 250 includes an AI integration module 220 configured to integrate the engineering-data extracted by the ontology and the knowledge graph editors. The AI integration module 220 is configured to update the knowledge base 230 by updating an ontology database 232 and/or a knowledge graph database 234.

The knowledge base 230 hosted on the cloud computing platform 250 may be a duplicate of the knowledge base 230 hosted within the factory automation environment 270. In an embodiment, the factory automation environment 270 may include a controller to determine which engineering data may be copied/transmitted to the knowledge base 230 on the cloud computing platform 250. A person skilled in the art may appreciate that the knowledge base 230 is distributed across both the factory automation environment 270 and the cloud computing platform 250.

In an embodiment, the engineer may directly access the knowledge base 230 using a user interface 240. The user interface 240 may be a web based graphical user interface configured to receive an input from the engineer (user input). The user input is published to the message broker 210 and subscribed to the knowledge base 232. The knowledge base 230 is configured to publish a response to the user input as a message to the message broker 210. The response may also be published to the engineering software 262, 266, 268 to trigger one or more actions in the engineering software. For example, the process element 265 may be automatically configured based on the response from the knowledge base 230.

In another embodiment, the operation of adding the process element 265 is published as a message to the message broker 210. The simulation software 266 is configured to subscribe to messages associated with the process element 265. Further, the simulation software 266 is configured to determine configuration parameters of the process element 265 based on simulation of the factory automation environment 270. The configuration parameters are published as messages to the message broker 210 and subscribed by the process engineering software 262. The notification may be displayed to the engineer on the graphical user interface 240 indicating the configuration parameters. Alternatively, the process engineering software 262 is triggered to automatically configure the process element 265 based on the configuration parameters published by the simulation software 266. A person skilled in the art may also appreciate that the process scheduling software 268 may also be used in a similar manner.

For example, the engineer is scheduling/enquiring regarding a paint recipe production process for automobile paints via the processing scheduling software 268. The simulation software 266 is triggered by the enquiry based on the enquiry message published to the message-broker 210. The simulation software 266 in response simulates the time required for a first batch of paint to be produced and publishes a simulation message to the message-broker 210. The simulation message 210 is displayed as a notification to the engineer scheduling the production of the paint recipe.

Figure 3:
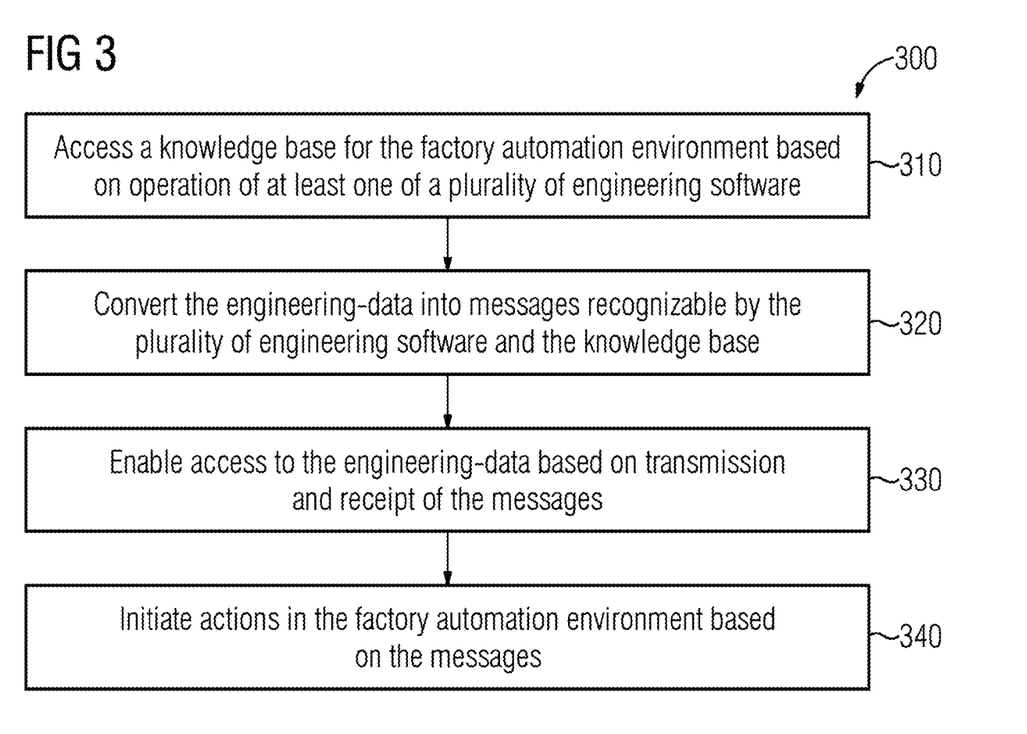
FIG. 3 illustrates a method of orchestrating one or more engineering software to engineer automation devices and systems in the factory automation environment, according to an embodiment.

FIG. 3 illustrates a method 300 of orchestrating one or more engineering software to engineer automation devices and systems in the factory automation environment, according to an embodiment of the present invention. The method begins at act 310 with accessing a knowledge base for the factory automation environment based on operation of at least one of the engineering software. The engineering software configured to generate and/or operate using engineering-data associated with at least one of design, commissioning, operation, and maintenance of the factory automation environment.

The act 310 includes analyzing operation of the plurality of engineering software, a user input from a web-based GUI, or a combination thereof, through at least one of neural networks, reinforcement learning, and rule-based logic. The analysis enables effective access to the knowledge base.

The operation and the user input are communicated to the knowledge base in the form of messages. Accordingly, act 320 includes converting the engineering-data into messages recognizable by the plurality of engineering software and the knowledge base. The messages are used by the knowledge base to map the operation and/or the user input to the engineering-data stored in the knowledge base. Act 320 may further include mapping the operation of the plurality of engineering software, the user input or the combination to the engineering-data in the knowledge base. For example, act 320 includes determining dependencies between the engineering-data in the knowledge base and the operation, the user input, and the combination-based pattern matching neural networks, reinforced learning, or pattern-based rules.

The transmission and reception of messages via the message-broker effectively amounts to updating and retrieving engineering-data in the knowledge base. Accordingly, act 330 includes enabling access to the engineering-data based on transmission and receipt of the messages.

A message-broker transmits the mapped engineering-data in the knowledge base as a notification message to the at least one engineering software to enable the at least one engineering software to initiate actions in the factory automation environment. Accordingly, act 340 includes enabling at least one engineering software to initiate actions in the factory automation environment based on the messages. Act 340 further includes displaying a notification on a GUI associated with the at least one engineering software indicating the actions to initiate in the factory automation environment. As indicated herein above, the actions and the notification are transmitted as the messages recognizable by the GUI, the engineering software and the knowledge base. Further, act 340 includes initiating the actions in the factory automation environment. Actions may be initiated by configuring or reconfiguring automation devices and components in the factory automation environment. Therefore, act 340 may also include engineering systems, sub-systems, or components in the factory automation environment based on the actions. Additionally, act 340 includes reconfiguring the systems, the sub-systems, or the components based on the actions.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processing units and program code for implementing each aspect of the technology may be centralized or distributed (or a combination thereof) as known to those skilled in the art. Additionally, while the current disclosure describes the indexing module and the crawler platform as independent components, the modules may be a software component and may be realized within a distributed control system or an engineering software suite. Additionally, in an embodiment, one or more parts of the engineering module may be realized within the technical system.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/device claims.

The invention claimed is:

1. An engineering system for a factory automation environment, the engineering system comprising:
 a message-broker configured to access and update a knowledge base based on operation of at least one engineering software of a plurality of engineering software, wherein the plurality of engineering software is configured to generate and/or operate using engineering-data associated with at least one of design, commissioning, operation, or maintenance of the factory automation environment, wherein the message-broker is configured to convert the engineering-data into messages recognizable by the plurality of engineering software and the knowledge base; and
 at least one Graphical User Interface (GUI) communicatively coupled to the message-broker configured to enable access to the engineering-data via the message-broker, whereby an engineering software of the plurality of engineering software is configured to initiate actions in the factory automation environment based on the messages,
 wherein the message-broker is communicatively coupled to one or more artificial intelligence modules configured to analyze operation of the plurality of engineering software, a user input from the at least one GUI, or a combination thereof,
 wherein the one or more artificial intelligence modules are configured to map the operation of the plurality of engineering software, the user input from the at least one GUI, or the combination thereof to the engineering-data in the knowledge base, and
 wherein the message-broker is configured to transmit the engineering-data to the engineering software of the plurality of engineering software to enable the engineering software to initiate actions in the factory automation environment, the artificial intelligence modules comprising a neural network module, a reinforcement learning module, a rule-based module, or a combination thereof.

2. The engineering system of claim 1, wherein the message-broker is communicatively coupled with a data integration module configured to integrate the engineering-data from the plurality of engineering software into the knowledge base.

3. The engineering system of claim 2, wherein the message-broker is configured to receive the engineering-data based on rule engines associated with the plurality of engineering software, and
wherein the rule engines are configurable based on industry standards or manufacturing requirements.

4. The engineering system of claim 3, wherein the message-broker is configured to enable multi-directional transmission of the messages from rule engines, the at least one GUI, and the artificial intelligence modules based on a unified message queue.

5. The engineering system of claim 4, wherein the knowledge base, the at least one GUI, the artificial intelligence modules, and the plurality of engineering software are modifiably registered as subscribers and/or publishers to the message-broker.

6. The engineering system of claim 5, wherein the messages are received and transmitted in a query format, a response format, a recommendation format, an action format, or a combination thereof.

7. The engineering system of claim 6, wherein the knowledge base comprises at least a graph-based database, an ontological database distributed within the factory automation environment, and a cloud computing platform.

8. The engineering system of claim 1, wherein the message-broker is configured to receive the engineering-data based on rule engines associated with the plurality of engineering software, and
wherein the rule engines are configurable based on industry standards or manufacturing requirements.

9. The engineering system of claim 1, wherein the message-broker is configured to enable multi-directional transmission of the messages from rule engines, the at least one GUI, and the artificial intelligence modules based on a unified message queue.

10. The engineering system of claim 1, wherein the knowledge base, the at least one GUI, the artificial intelligence modules, and the plurality of engineering software are modifiably registered as subscribers and/or publishers to the message-broker.

11. The engineering system of claim 1, wherein the messages are received and transmitted in a query format, a response format, a recommendation format, an action format, or a combination thereof.

12. The engineering system of claim 1, wherein the knowledge base comprises at least a graph-based database, an ontological database distributed within the factory automation environment, and a cloud computing platform.

13. A method of orchestrating a plurality of engineering software associated with a factory automation environment, wherein the plurality of engineering software comprises varied data structure and syntax, the method comprising:
  accessing a knowledge base for the factory automation environment based on operation of at least one engineering software of the plurality of engineering software, wherein the plurality of engineering software generates and/or operates using engineering-data associated with at least one of design, commissioning, operation, or maintenance of the factory automation environment;
  converting the engineering-data into messages recognizable by the plurality of engineering software and the knowledge base using one or more artificial intelligence modules, wherein the one or more artificial intelligence modules map an operation of the plurality of engineering software, user input, or a combination thereof to the engineering-data in the knowledge base;
  enabling access to the engineering-data based on transmission and receipt of the messages; and
  enabling an engineering software of the plurality of engineering software to initiate actions in the factory automation environment based on the messages.

14. The method of claim 13, further comprising:
  integrating the engineering-data from the plurality of engineering software into the knowledge base.

15. The method of claim 13, further comprising:
  analyzing operation of the plurality of engineering software, a user input from a Graphical User Interface (GUI), or a combination thereof through neural networks, reinforcement learning, rule-based logic, or combinations thereof; and
  mapping the operation of the plurality of engineering software, the user input from the GUI, or the combination thereof to the engineering-data in the knowledge base,
  wherein a message-broker transmits the engineering-data to the engineering software to enable the engineering software to initiate actions in the factory automation environment.

16. The method of claim 15, wherein the analyzing of the operation comprises:
  determining dependencies between the engineering-data in the knowledge base and the operation, the user input, or the combination thereof based pattern matching neural networks, reinforced learning, or pattern-based rules.

17. The method of claim 13, further comprising:
  displaying a notification on a Graphical User Interface (GUI) associated with the engineering software indicating the actions to initiate in the factory automation environment,
  wherein the actions and the notification are transmitted as the messages recognizable by the GUI, the plurality of engineering software, and the knowledge base.

18. The method of claim 13, wherein the actions initiated in the factory automation environment comprise:
  engineering systems, sub-systems, or components in the factory automation environment based on the actions received as the messages by a Graphical User Interface (GUI); and
  reconfiguring the systems, the sub-systems, or the components based on the actions received as the messages by the GUI.

19. A computer program product, comprising computer readable code, that when executed on a processor, is configured to:
  access a knowledge base for a factory automation environment based on operation of at least one engineering software of a plurality of engineering software, wherein the plurality of engineering software generates and/or operates using engineering-data associated with at least one of design, commissioning, operation, or maintenance of the factory automation environment;
  convert the engineering-data into messages recognizable by the plurality of engineering software and the knowledge base using one or more artificial intelligence modules, wherein one or more artificial intelligence modules map an operation of the plurality of engineering software, user input, or a combination thereof to the engineering-data in the knowledge base;

enable access to the engineering-data based on transmission and receipt of the messages; and enable an engineering software of the plurality of engineering software to initiate actions in the factory automation environment based on the messages.

* * * * *